Nov. 22, 1966 W. JONES, JR 3,286,891
CARRIER ATTACHMENT FOR TWO WHEEL VEHICLES
Filed May 3, 1965
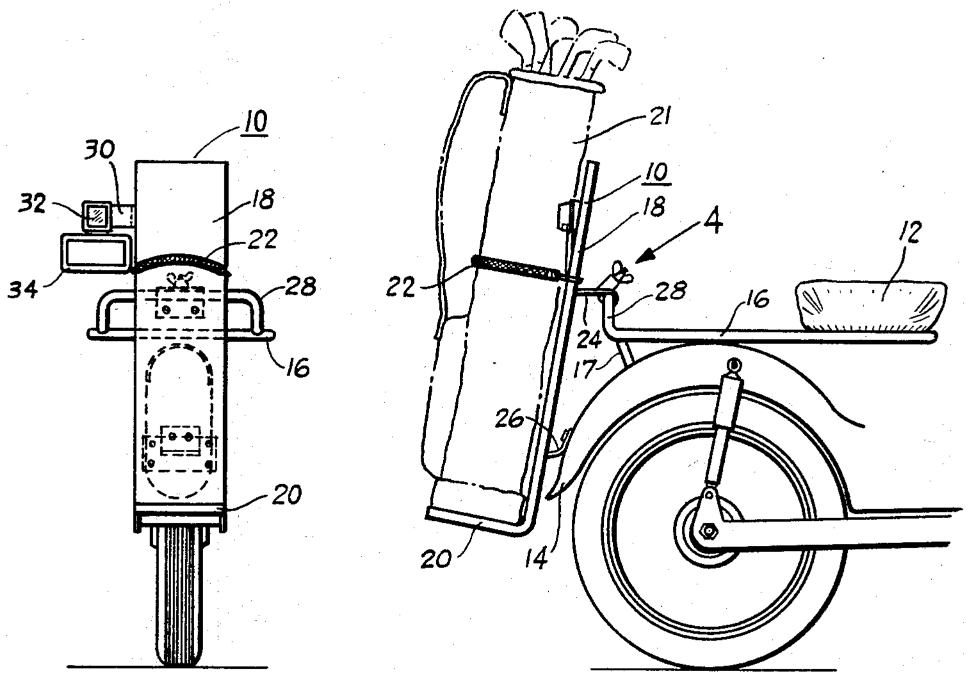
FIG_1 FIG_2
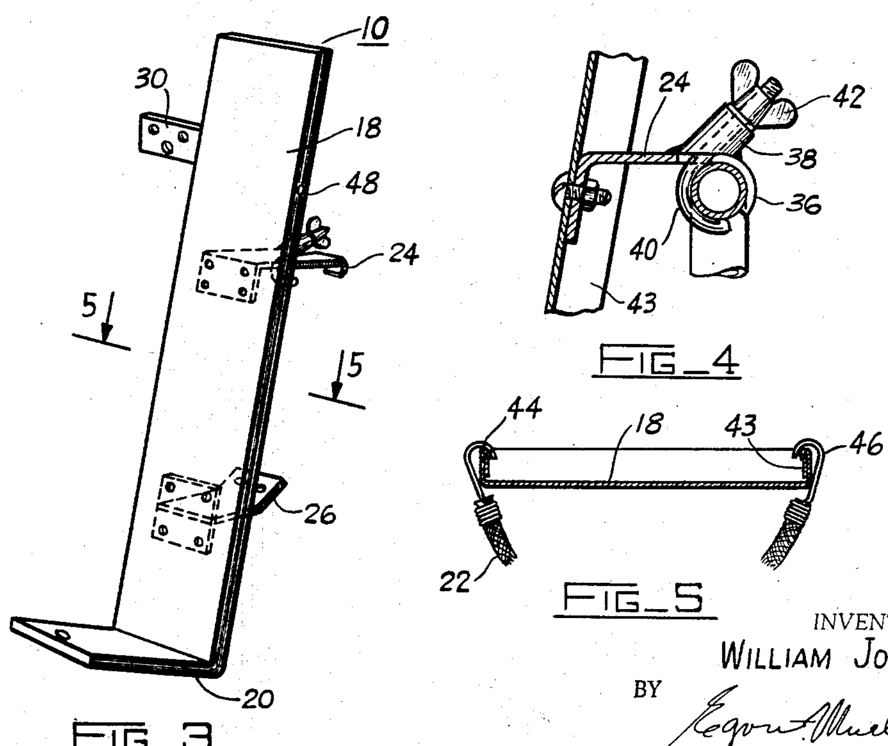
FIG_3 FIG_4 FIG_5
INVENTOR.
WILLIAM JONES, JR.
BY
ATTORNEY.

United States Patent Office 3,286,891

Patented Nov. 22, 1966

3,286,891

CARRIER ATTACHMENT FOR TWO WHEEL VEHICLES

William Jones, Jr., 244 N. Orange St., Escondido, Calif.

Filed May 3, 1965, Ser. No. 452,798
3 Claims. (Cl. 224—39)

This invention relates to a carrier attachment for two wheel vehicles and more particularly to a carrier attachment for two wheel vehicles that is fixed to the rear of the vehicle and is capable of carrying baggage, golf clubs, and similar shaped items.

In recent years, travel on two wheel vehicles such as motorcycles, motorbikes and the like has become very popular. While motorcycles have long been used in many foreign countries as a necessary means of travel, until recently in the United States their use has been primarily for pleasure, sporting activities and the like. More recently, of course, many necessary uses for motorcycles have developed in this country such as their use in short haul type environments where it is inefficient to drive a larger automobile or in particular environments, such as mountainous or rough terrain areas. More specific uses are, for example, driving to and from super market, golf courses, to downtown sections or the like. The ease in parking motorcycles is obvious and they are easy to drive through traffic. Accordingly their use is becoming wide spread.

There is however a limitation in the use of two wheel vehicles such as the motorcycles that are now being sold. This is the inability of the motorcycle to effectively carry baggage. Often users want to use the motorcycle for other than to just carry themselves. It may be that the rider wants to go to the super market and carry home groceries, or to go to the golf course with his clubs. Or it may be that the user wants to go out into the rough terrain and to carry his gun with him.

The accepted structure of the motorcycle has restricted its use in carrying articles. While some prior art baggage carriers have been fixed to motorcycles, in general such structures have been so unacceptable that they are not used.

This achieves a minimum connection with maximum stability. The carrier attachment also has a retaining means that may be fastened at select points along the long side of the L shaped member for holding the carried objects in a retained position on the carrier attachment.

The carrier attachment of this invention when fixed to the rear of the motorcycle does not interfere with the normal driving or riding of the motorcycle in carrying any object or persons on the luggage carrier. The carrier attachment or the objects carried do not increase the width of the motorcycle, since while the width of the attachment is greater than the rear fender it has less width than the motorcycle's handlebars or luggage carrier. Also since the carrier attachment is close to the rear axle of the vehicle and in the same plane with the two wheels, it does not interfere with the stability of the motorcycle. Thus golf clubs, guns, baggage and the like may be easily carried on the carrier attachment and not distract from the use, appearance or enjoyment of the motorcycle.

The nature and advantage of my invention will appear more fully from the following description and the accompanying drawings wherein a preferred form of the invention is shown, and wherein like figures designate like parts throughout the drawings in which:

FIGURE 1 is an elevational view of the rear end of a motorcycle with the carrier attachment of this invention;

FIGURE 2 is a side elevational view of the rear portion of the motorcycle with the carrier attachment of this invention;

FIGURE 3 is a view of the carrier attachment of this invention;

FIGURE 4 is a more detailed view of the bracket that secures the upper portion of the carrier attachment to the rear bar of the luggage carrier; and FIGURE 5 is a view of the manner of fastening the retaining cable to the carrier attachment.

Usually the prior known attachments are so constructed and positioned as to cause the vehicle to be unstable when parked or in operation. The structures often place strains and stresses on the vehicle's structure at unacceptable points and all such structures tend to distract from the overall appearance and beauty of the motorcycle.

In view of the foregoing it is an object of this invention to provide an improved and novel carrier attachment for two wheel vehicles.

It is another object of this invention to provide an improved and novel carrier attachment that is simple and strong in construction and yet can be easily attached to existing motorcycles.

It is another object of this invention to provide an improved and novel carrier attachment that may be secured to a motorcycle for carrying longitudinally shaped loads and that does not interfere with the normal operation and use of existing parts of the motorcycle.

It is another object of this invention to provide an improved and novel carrier attachment for carrying articles of a longitudinal shape in the manner that they do not cause an unbalancing of the motorcycle either while parked or in operation.

This invention concerns a carrier attachment having a substantially L shape that is secured to the rear portion of the motorcycle. The attachment comprises a substantially flat L shaped plate with the short side of the L shaped member facing rearwardly and inclined at a slight angle upward. This facilitates carrying longitudinal objects such as golf clubs, golf carts, guns or the like. The means for attaching the carrier attachment to the motorbike comprises single bracket connectors that fasten the center of respective upper and lower parts of the carrier attachment to the rear fender and rear luggage carrier bar.

This achieves a minimum connection with maximum stability. The carier attachment also has a retaining means that may be fastened at select points along the long side of the L shaped member for holding the carried objects in a retained position on the carrier attachment.

Referring now to FIGURE 2, there is shown the rear end portion of a two wheel vehicle 12, such as a motorbike, motorcycle or the like. The motorcycle 12 has a seat for carrying the operator, a rear wheel, a frame member, a shock absorber positioned between the rear wheel supporting frame member and the rear fender 14 and a luggage carrier 16. In addition to other support means the luggage carrier 16 is supported by the rear fender through support member 17.

Mounted on the motorcycle 12 is the carrier attachment 10 that has an L shape. The long side of the L is positioned with a slight angle to vertical and the short side 20 is directed away from the rear of the motorbike at a slight angle to a horizontal direction. The carrier attachment 10 has a width (see FIGURE 1) that is substantially greater than the width of the fender 14 but less than the width of the luggage carrier 16 and with a thickness sufficient to carry the load. The L shaped member may be a solid plate that is made of wood, metal or the like or made of sheet metal that is rolled over at the edges forming flanges 43. The latter construction has the advantage of reduced weight and cost and for most purposes has sufficient strength.

The carrier attachment is secured to the motorcycle (see FIGURE 2) by an upper bracket 24 and a lower bracket 26. The upper bracket (see FIGURES 3 and 4) comprises an angled flange member with an arcuate end portion 36 that hooks over the upper tubular projection 28 of the luggage carrier 16. A wing nut 42 draws a second hook member 40 to secure the bracket in the manner shown. The lower portion of the carrier attachment is secured by a T shaped flange member 26 in the manner shown.

In general motorcycle construction, the license plate and tail light are fixed to the rear fender 14 at substantially the point of attachment of the lower flange support member 26. Accordingly when attaching the carrier attachment of this invention to the motorcycle, the tail light and license plate are removed from fender 14 and the carrier attachment flange member 26 secured in the already available holes in the fender. A flange 30 is secured to one side of the upper portion 18 of the carrier attachment for supporting the tail light and license plate moved from the fender.

A retaining means or cable 22 of well known construction may have hook members 44 and 46 for passing around an object carried and attached to the flange 43 of the part 18 of the carrier attachment. It should be recognized that flange 43 may have an aperture 48 (see FIGURE 3) for appropriately receiving the hooks 44 and 46 and thus preventing the hooks and retaining cable 22 from sliding along the length of member 18. A hole 25 in the short side of the L shaped member may receive brackets or other projections for holding golf clubs or the like to the plate member 20.

In operation a golf club, cart or other baggage may be placed on the carrier in the manner shown. The hooks 44 and 46 may then be hooked over the flange 43 as shown in FIGURE 5 or hooked through apertures 48 as shown in FIGURE 3. An appropriate bracket may be passed through hole 25 and attached to the lower portion of the baggage, golf cart or the like holding the member to the plate 20 in the manner shown. After the luggage is appropriately secured to the motorcycle, the motorcycle then may be driven in the well known manner.

Having thus described my invention, I claim:

1. A carrier attachment in combination with a two wheel vehicle having a rear fender and a rear luggage carrier comprising, a substantially flat L shaped plate for carrying articles such as golf clubs, baggage and the like, being positioned rearwardly of said rear fender and luggage carrier with the short side of said L projecting rearwardly, a single first attachment being secured to the center of said plate for securing the lower portion of said plate to the lower portion of said fender, a single attachment being secured to the center of said plate for securing the upper portion of said plate to said luggage carrier, a single bracket secured to the lateral edge of said upper portion of said plate, and a single retainer releasably secured to each side of said upper portion of said plate for holding said articles to said carrier.

2. A carrier attachment in combination with a two wheel vehicle having a rear fender and a rear luggage carrier comprising, a substantially flat L shaped plate for carrying articles, said plate being positioned rearwardly of said rear fender and luggage carrier with the short side of said L projecting rearwardly and at a small upward angle with the level of said vehicle, said plate having a width greater than said fender and less than said luggage carrier, and said short side having a length about one-quarter that of the long side of said L shaped plate, a T shaped flange bracket for securing the lower portion of said plate to the lower portion of said fender, an L shaped flange bracket including a wing nut securing member for securing the upper portion of said plate to said luggage carrier, bracket means secured to the lateral edge of said upper portion of said plate for carrying the tail light and license plate, and a cable being releasably secured to each side of said upper portion of said plate for holding said articles to said carrier.

3. A carrier attachment in combination with a two wheel vehicle having a rear fender and a rear luggage carrier comprising, a substantially flat L shaped plate for carrying articles, said plate being positioned rearwardly of said rear fender and luggage carrier with the short side of said L projecting rearwardly and at a small upward angle with the level of said vehicle, said plate having a width greater than said fender and less than said luggage carrier, a single T shaped flange bracket for securing the lower portion of said plate to the lower portion of said fender, a single L shaped flange bracket including a wing nut securing member for securing the upper portion of said plate to said luggage carrier, bracket means secured to the lateral edge of said upper portion of said plate for carrying the tail light and license plate, and a cable having hooks at either end for being releasably attached to each side of said upper portion of said plate for holding said articles to said carrier.

References Cited by the Examiner

UNITED STATES PATENTS

| | | | |
|---|---|---|---|
| 1,013,863 | 1/1912 | Cronk | 224—42.44 |
| 1,683,169 | 9/1928 | De Noya | 224—42.39 |
| 3,202,332 | 8/1965 | Walker | 224—42.03 |

FOREIGN PATENTS

| | | |
|---|---|---|
| 869,567 | 11/1941 | France. |
| 1,087,598 | 8/1954 | France. |
| 1,097,158 | 2/1955 | France. |
| 895,412 | 11/1953 | Germany. |
| 278,189 | 10/1927 | Great Britain. |

OTHER REFERENCES

W11606 II/63g, April, 1956, German printed application.

GERALD M. FORLENZA, *Primary Examiner.*

F. WERNER, *Assistant Examiner.*